United States Patent [19]

Wong et al.

[11] Patent Number: 4,612,203

[45] Date of Patent: Sep. 16, 1986

[54] ACIDIFIED MEAT ANALOG PRODUCTS

[75] Inventors: Vincent Y. Wong, West Chester; David A. Volker; Lydia A. Jury, both of Cincinnati; David J. Bruno, Jr., Cincinnati, all of Ohio

[73] Assignee: The Procter & Gamble Company, Cincinnati, Ohio

[21] Appl. No.: 666,706

[22] Filed: Oct. 31, 1984

[51] Int. Cl.$^4$ .............................................. A23J 1/14
[52] U.S. Cl. .................................. 426/589; 426/802; 426/104; 426/438
[58] Field of Search ............... 426/656, 589, 321, 241, 426/104, 629, 634, 506, 507, 802, 438, 453

[56] References Cited

U.S. PATENT DOCUMENTS

| | | | |
|---|---|---|---|
| 2,730,448 | 1/1956 | Boyer et al. | 99/14 |
| 3,454,406 | 7/1969 | Alderton | 99/215 |
| 3,706,631 | 12/1972 | Falk | 426/241 |
| 3,736,148 | 5/1973 | Katz | 99/17 |
| 3,772,035 | 11/1973 | Carp et al. | 426/656 |
| 3,800,053 | 3/1974 | Lange | 426/364 |
| 3,886,296 | 5/1975 | Brooks et al. | 426/325 |
| 3,962,335 | 6/1976 | Kumar | 426/574 |
| 4,125,630 | 11/1978 | Orthoefer | 426/104 |
| 4,206,239 | 6/1980 | Horner | 426/589 |
| 4,230,738 | 10/1980 | Shemer et al. | |
| 4,539,212 | 9/1985 | Hunter | 426/326 |
| 4,560,564 | 12/1985 | Bruno et al. | 426/104 |

OTHER PUBLICATIONS

Altschul, 1974, New Protein Foods, Academic Press, New York, pp. 371-375.
Komarek et al., 1974, Food Products Formulary, vol. 1, AVI Publishing Co., Westport, CT, pp. 125-130.
Powers, J. J., "Effect of Acidification of Canned Tomatoes on Quality and Shelf Life", Critical Reviews in Food Science and Nutrition, pp. 371-396, Jun. 1976.
Gould, W. A., Tomato Production, Processing & Quality Evaluation, AVI Publishing Co., Inc., Westport, CT, pp. 334-346, (1974).
Sognefest, P., and Jackson, J. M., "Pre-Sterilization of Canned Tomato Juice", Food Technology, vol. 1, No. 1, pp. 78-84, (1947).
21 C.F.R., §113, 114, §114.90.

Primary Examiner—Raymond N. Jones
Assistant Examiner—Carolyn Paden
Attorney, Agent, or Firm—Edmund F. Gebhardt; Rose Ann Dabek; Richard C. Witte

[57] ABSTRACT

This invention relates to acidified sauce products, specifically, to products containing textured protein or analog simulating loose, cooked ground meat. This invention further relates to an acidification process for the preparation of such products. This acidification process minimizes the necessary pH equilibration time and generates a shelf-stable product with optimum texture and flavor, and low fat content.

19 Claims, 10 Drawing Figures

UNACIDIFIED

ACIDIFIED

UNACIDIFIED

ACIDIFIED

UNACIDIFIED

ACIDIFIED

UNACIDIFIED

ACIDIFIED

ACIDIFIED MEAT ANALOG PRODUCTS

TECHNICAL FIELD

This invention relates to acidified sauce products, specifically, to products containing textured protein or analog simulating loose, cooked ground meat. This invention further relates to a process for the preparation of such products.

BACKGROUND OF THE INVENTION

A variety of food products containing meat are readily adaptable to replacement of their normal meat constituents with textured vegetable protein. These foods include sauces such as spaghetti sauce, taco sauce, chili mixes and others. Purely thermal sterilization of such products leads to loss in flavor acceptability due to the development in the product of burned and browned flavors, as well as thermal reaction product off-flavors.

The Federal Regulations of the Food and Drug Administration permit canners of foods to acidify their products to a pH of 4.6 or below as an alternative to thermal retort sterilization. By acidification of such products to a pH of 4.6 or below, the products are rendered microbiologically safe if the products are sealed into containers at elevated temperatures, and held for a sufficient time to destroy molds, yeasts, and vegetative bacteria prior to cooling. Most acidified foods are kept at a pH well below 4.6, because above about 4.2, growth of *Bacillus coagulans* occurs, causing flat sour spoilage of the product. Acidification permits use of less severe processing conditions without sacrificing product safety.

Several processing techniques for acidification are approved by the Food and Drug Administration. These include (1) blanching of the food ingredients in acidified aqueous solutions; (2) immersion of the blanched food in acidified aqueous solutions; (3) direct batch acidification by adding a known amount of an acid solution to a specified amount of food; (4) direct addition of a predetermined amount of acid to individual containers during production; and (5) addition of acid foods to low-acid foods in controlled proportions to conform to specific formulations.

When meat, poultry, or textured protein is a component of acidified foods it acts as a buffer and raises the pH of the product. At a higher pH the growth of bacteria is favored. In addition, the internal pH of pieces of textured protein, meat, or poultry, can have a center pH greater than that of the food product as a whole, thus providing an environment favoring bacterial growth. Therefore, to insure product safety and stability it must be permitted to equilibrate to assure that a low center pH has been achieved. This equilibration time can require several days or weeks depending upon the characteristics of the individual product. A means for minimizing this equilibration time while assuring a safe shelf-stable product is desirable.

U.S. Pat. No. 3,886,296 of Brooks et al., issued May 27, 1975, discloses a hot acid blanching process for canning foods wherein the food particles are blanched with a hot acid solution to a pH of 5.0, submersed totally within a liquid phase having a pH below 4.5, and heat sterilized. The pH of the food is measured on the total product in comminuted form. However, the pH of the center of discrete pieces could be higher. Direct acidification, instead of acid blanching, of meat, poultry or textured protein particles ot a pH well below 5.0 would aid in decreasing the time required to lower the pH throughout the product. Direct acidification would also eliminate the requirement for total liquid coverage of food particles in the final product. However, it has been found that if ground meat or poultry is acidified to below about 4.8 prior to its combination with a liquid or sauce phase the meat becomes discolored and disintegrated. Acid blanching causes destruction of cellular integrity, and meat or poultry becomes soft or mushy in texture. Acidification can also have an adverse effect on textured protein. Acidification of textured protein can cause it to disintegrate by decreasing the functionality of the binder employed. As pH decreases, binding generally decreases. Texture and size of the meat, poultry, or protein pieces is critical to product quality and acceptance. A process for acidification of food products containing significant amounts of textured vegetable protein which rigorously protects product safety, while having a minimal impact on product texture is needed.

U.S. Pat. No. 3,736,148 of Katz, issued May 29, 1973, discloses meat analogs resistant to microbiological spoilage having a pH between 3.0 and 5.4 and a water activity of below 0.95. Katz restricts the water level of the analogs as an aid in preventing the growth of microorganisms. Restriction of water activity limits the optimum texture and flavor which can be achieved. The Katz analogs contain preservatives and texture modifiers such as starches, gums, and the like. Natural products without food additives such as preservatives and texture modifiers are preferred by consumers. It is desirable to have textured protein products which do not contain preservatives and texture modifiers that are microbiologically safe without restriction of the water activity in order to optimize texture and flavor.

As the pH is decreased, textured protein present in food products begins to acquire a sharp, sour, astringent flavor, presumably due to some chemical change in the material at this pH. Thus, acidification can have a detrimental effect on flavor just as purely thermal processing. A process for sterilization of acidified food products containing significant amounts of textured vegetable protein which rigorously protects product safety, while having a minimal impact on product flavor is needed.

A process has now been found for direct acidification of a product containing textured protein. Disintegration of the protein particles is avoided and an optimum texture is provided. No increase in sour flavor occurs despite the decrease in pH. In addition, other beneficial effects of this acidification process are to reduce pH equilibration time for large textured protein or analog pieces, and to reduce fat absorption by the protein during heatsetting. Thus, a microbiologically safe product containing textured protein or analog having a desirable firm texture and acceptable flavor with reduced fat levels can be generated by this acidification process.

It is therefore an object of this invention to provide a shelf-stable acidified textured protein sauce product containing discrete pieces of protein or analog of optimal texture which has a pH of less than 4.6, acceptable flavor, and reduced fat content.

It is a further object of this invention to provide a process which renders a food product having a pH less than 4.6 and containing high levels of textured protein bacteriologically safe and shelf-stable.

It is a further object of this invention to provide a process for minimizing the pH equilibration time required for a textured protein product containing large discrete pieces of protein or analog.

It is a further object of this invention to provide a process for the preparation of an acidified textured protein product with less fat.

It is a further object of this invention to provide a process for the preparation of an acidified textured protein product of optimal texture without disintegration of the protein.

It is a further object of this invention to provide a process for the preparation of an acidified textured protein product of low pH with an acceptable flavor.

These and other objects of the invention will become obvious from the following descriptions and examples.

DISCLOSURE OF THE INVENTION

Figure 1:
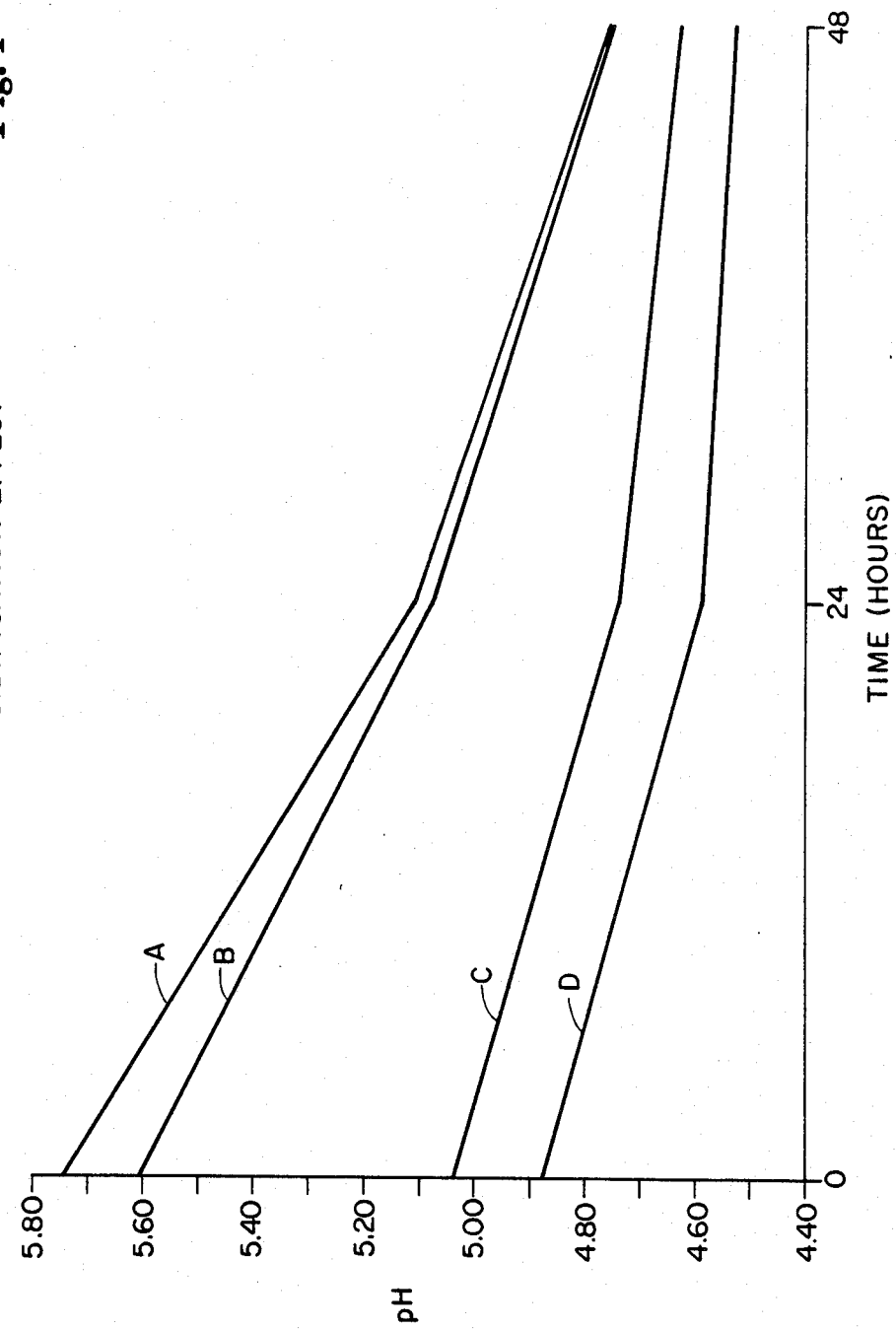
FIG. 1 depicts a graph of the internal pH of ground beef particles versus time for (1) ground beef particles added to commercially available spaghetti sauces which were then acidified, denoted as lines A and B, and (2) acidified ground beef particles added to the same sauces, denoted as lines C and D.

This invention relates to a shelf-stable acidified sauce product containing textured protein or analog of optimum texture simulating loose, cooked ground meat. The product has an equilibrium pH of less than 4.6, a water activity of about 0.96 or greater, and a minimum analog texture of 75 kg-cm. This invention further relates to a process for the preparation of such products comprising: (a) adding an edible acid to textured protein material having at least about 25% protein to lower the pH to between about 3.8 and about 5.5; (b) adding a proteinaceous binder to the acidified textured protein material to step (a) to effect agglomeration; (c) heatsetting the agglomerated acidified textured protein of step (b) to form an analog; (d) combining the analog of step (c) with a sauce; (e) heating the product to sterilize it; and (f) equilibrating the sauce product until the pH is less than 4.6. This acidification process minimizes the necessary pH equilibration time, and results in a desirable firm texture in the analog pieces. It also reduces the fat content and does not increase the sour flavor of the product when compared to a similar product in which the acidification occurs after the combination of the heatset textured protein and sauce components of the product.

DESCRIPTION OF PREFERRED EMBODIMENTS

This invention comprises a direct acidification process for the preparation of an improved textured protein or analog product. Additionally, this invention comprises the product prepared by such a process.

The term "sauce product" as used herein includes tomato-based meat-type sauces such as spaghetti sauces, taco sauces, barbecue sauces, chili sauces, and the like, which contain textured protein, analog, a mixture of meat and textured protein, or a mixture of meat and analog.

The term "textured protein" includes all textured protein materials well known in the art, as well as textured single-cell proteins. Mixtures of textured vegetable protein or textured single-cell protein with up to about 90%, but preferably less than about 50% of materials of animal origin, including egg albumen, meat, meat juices, chicken, fish, serum blood, meat by-products, hydrolyzed animal protein, and the like, are also included. The textured protein material preferably contains at least about 25% by weight protein. The textured protein is most preferably a textured vegetable protein. The textured protein is present in the sauce product at levels of from about 1% to about 25% by weight. Preferably, the textured protein is present at a level of from about 2% to about 20% by weight of the product.

The term "analog" or "meat analog" as used herein denotes protein which has been texturized, such as by extrusion cooking, comminuted, mixed with some or all of the following: seasonings, spices, colorants, other proteins, binder, water, and fat, and then heatset, and sized to a suitable particle size. The analog is present in the sauce product at levels of from about 5% to about 70% by weight. Preferably, the analog is present at a level of from about 10% to about 50% by weight of the product.

The term "screened sauce" denotes the tomato sauce product of the present invention with the textured protein and any other large particles removed by filtration through a screen, i.e., the filtrate. The screen size preferably employed is U.S. Mesh 10.

The term "screened analog" as used herein denotes the textured protein or analog and any other large particles removed from the product of the present invention by filtration through a screen. The screen size preferably employed is U.S. Mesh 10.

The term "macerated analog" is used herein to denote screened analog that has been comminuted.

The term "center pH" or "internal pH" as used herein denotes the pH of the center of discrete pieces of food. The pH of a minimum of 15 pieces are analyzed and averaged.

The term "equilibration pH" as used herein denotes a center particle pH of less than 4.6.

The term "equilibration time" as used herein denotes the time required for the center particle pH of each discrete food piece to reach 4.6 or less.

The term "water activity" or "$a_w$" is used herein to mean the ratio of the fugacity of water in the system being studied to the fugacity of pure water at the same temperature. The water activity of the compositions herein can be measured using well-known physical chemical techniques and commercially available instruments.

It has been found that acidification at different points in the processing of the product yields different product characteristics. If the protein and sauce components are combined prior to acidification, the product has a softer texture, a higher fat content, and pH equilibration of the product can require two weeks or more. Alternatively, if the protein component is directly acidified prior to combination with the sauce component, the product has a desirable texture, reduced fat content, no increase in sour flavor, and pH equilibration can be achieved in about 48 hours.

PROCESS

The process of the present invention for preparing a shelf-stable acidified sauce product containing textured protein or analog comprises: (a) adding an edible acid to textured protein material having at least about 25% protein to lower the pH to between about 3.8 and about 5.5; (b) adding a proteinaceous binder to the acidified textured protein material of step (a) to effect agglomeration, (c) heatsetting the agglomerated acidified textured protein of step (b) to form an analog; (d) combining the analog of step (c) with a sauce; (e) heating the combination to sterilize; and (f) equilibrating the sauce mixture until the pH is less than about 4.6.

In the process of the present invention the protein is preferably extrusion cooked prior to acidification. Several techniques for extrusion cooking are known in the art. Fat, flavors, seasonings, spices, acidulants, and color, can be added during extrusion cooking, or mixed with the protein after cooking in combination with water, acid, and binder proteins. The binder is most preferably added after, and not prior to, the extrusion cooking step to preserve its functionality necessary for crosslinking with the extrudate mixture during heatsetting. After extrusion the textured protein component can then optionally be mixed with meat, preferably in ground or chunk form. Preferably, the extrusion is at a temperature and pressure under which water vaporizes. This results in an expanded porous structure necessary for optimum texture. If extruded under different conditions, the extrudate will have a dense structure that is less porous.

The first step of the process of the present invention comprises direct acidification of the protein component by adding an edible acid to the protein to lower the pH to between about 3.8 and about 5.5. Any edible organic or inorganic acid is suitable, but inorganic acids are preferred. These include phosphoric, hydrochloric, carbonic, sodium hydrogen phosphate, anhydric chloric acid, and the like. The acid can be diluted with water and used to hydrate the protein, or the acid can be mixed with the protein after hydration. Preferably, the acid is added at a level of about 0.8 to about 1.2% by weight of the protein.

In the second step of the process of the present invention the acidified protein is combined with a proteinaceous binder to effect agglomeration. The acidified protein is preferably subjected to an agglomeration process, in which large particles are made from smaller ones by mixing or coating the smaller particles with any of a variety of proteinaceous binders known in the art, along with colors and flavors, if desired, and heatsetting the binder. Suitable binders include egg white, soy protein fractions, cottonseed proteins, and the like.

The preferred binder is egg white. In the sauce product of the present invention, the binding functionality is affected by pH. As pH is decreased by acidification, binding also decreases and higher levels of egg white are required. For example, if the textured protein is acidified to a pH of from about 3.8 to about 4.6, the amount of egg white needed for effective binding is from about 6% to about 12% by weight of the agglomerated textured protein. If the textured protein is acidified to a pH of from about 4.6 to about 5.5, the amount of egg white needed for effective binding is from about 3% to about 6% by weight of the agglomerated textured protein.

Any method of heatsetting textured protein known in the art can be employed in the third step of process of the present invention, such as frying, baking, heating with microwave or radiant heat, and the like. Preferred is heatsetting in the presence of oil. The heatsetting can be either a batch or continuous process. Typical batch methods include skillet or grill frying in the presence of oil. Continuous frying methods can include techniques whereby the agglomerated texturized protein is distributed along an endless belt which is immersed in heated frying oil for at least a portion of its travel, prior to removal of the fried analog particles. Batch frying temperatures start at about 127° C. and drop thereafter, due to evaporative cooling, to as low as 104° C. In a continuous immersion frying technique, temperatures of from about 104° C. to about 177° C. can be employed. The fried or neat analog contains pieces of various diameters. The size of the pieces is not limited. For example, pieces having diameters of about 0.75 inch (1.91 cm), about 1 inch (2.54 cm), or about 1.5 inches (3.81 cm), are suitable for use in the present invention.

Alternatively, the textured protein can be contacted with acid after heatsetting. The heatset analog can be soaked in an acidic solution until the desired pH is obtained. The conditions of the acid soak, such as acid type, analog-to-acid solution ratio, pH of the acid solution, temperature, and the like, can be readily determined by experimentation by one skilled in the art. After such an acid soak, the analog can optionally be heatset a second time.

The fourth step of the process of the present invention comprises combining the heatset acidified textured protein or analog with a sauce having a maximum pH of about 4.5. The sauce component of the product can be sterilized prior to its combination with the acidified analog component if necessary. If the pH of the sauce is less than 4.2, prior sterilization is not required. If the pH of the sauce is 4.2 or greater, the sauce can be sterilized by any of the techniques known in the art such as high-temperature short-time sterilization.

In the fifth step of the process of the present invention the combined analog and sauce components are heated to destroy the vegetative cells of microorganisms of public health significance and those of nonhealth significance capable of reproducing in the product. For example, the product can be held at a temperature of from about 180° F. (82° C.) to about 220° F. (104° C.) for about 20 minutes. This destroys any acid-tolerant microorganisms and renders the product sterile. The food product is then packed in hermetically sealed containers, preferably by a hot-fill-hold technique. While "hermetically sealed containers" is usually used to refer to jars and cans, it can be appreciated that newer aseptic packages, such as plastic and foil plastic laminate pouches, can also be adapted to this process. In hot-fill-hold processing the container is filled with product at a temperature of at least about 180° F. (82° C.) and held for about 2 to 5 minutes, preferably about 3 minutes, before cooling.

After the container is sealed it is important that portions of the container not contacted by product be heated to the same temperature as the product. For example, if jars are filled with product, a post-capping hot water spray directed at the lid and headspace of the jar can be used to provide for lid and headspace heating. The product is then cooled to storage temperatures for pH equilibration.

Figure 2:
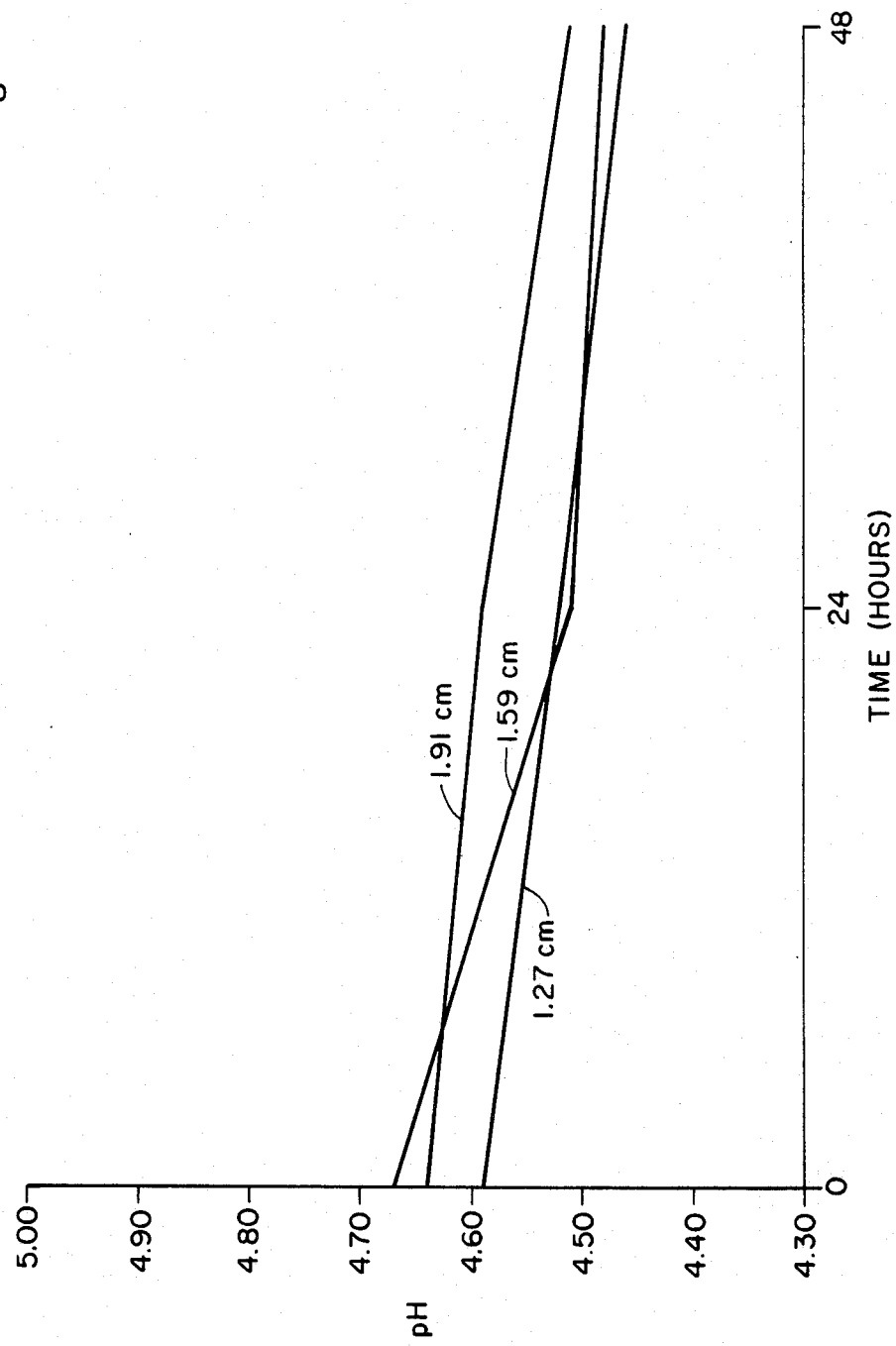
FIG. 2 depicts a graph of the internal pH of an analog particles of various diameters versus time for the product of the present invention.
Figure 3:
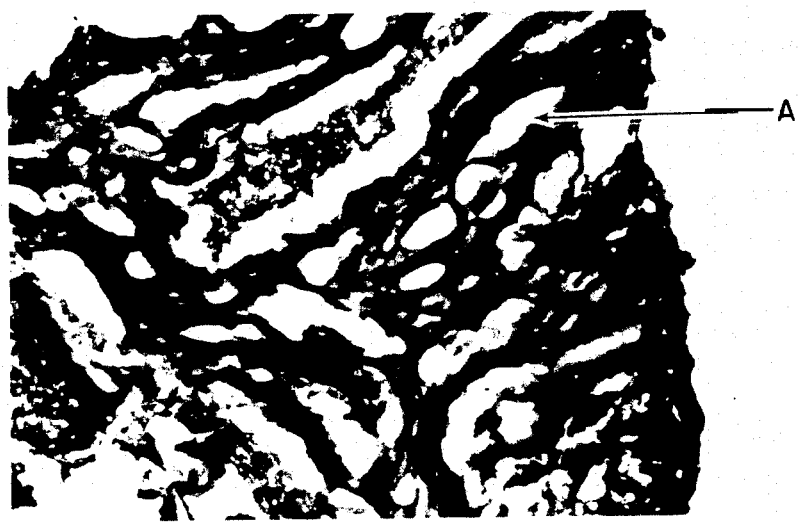
FIGS. 3 and 5 each depict a photomicrograph of unacidified analog magnified sixteen times and stained with periodic acid-leucobasic fuchin (Schiff's)—aniline blue black.
Figure 4:
FIGS. 4 and 6 each depict a photomicrograph of acidified analog as used in the product of the present invention magnified sixteen times and stained with periodic acid-leucobasic fuchin (Schiff's)—aniline blue black.
Figure 5:
Figure 6:
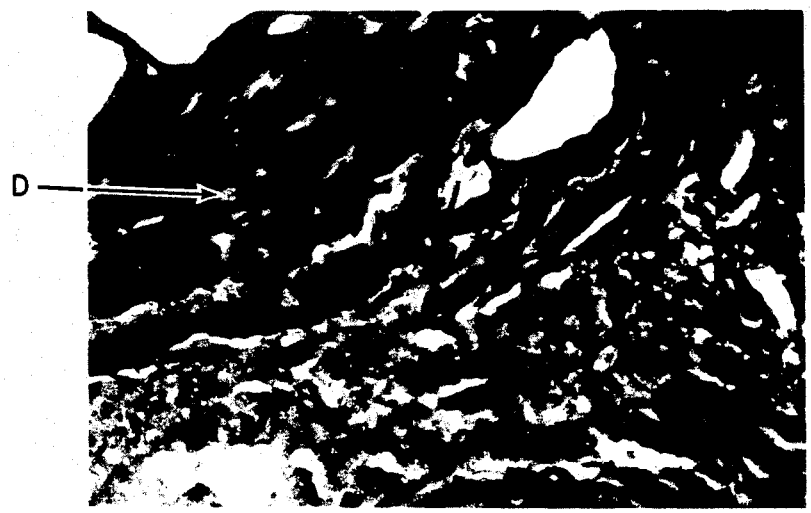
Figure 7:
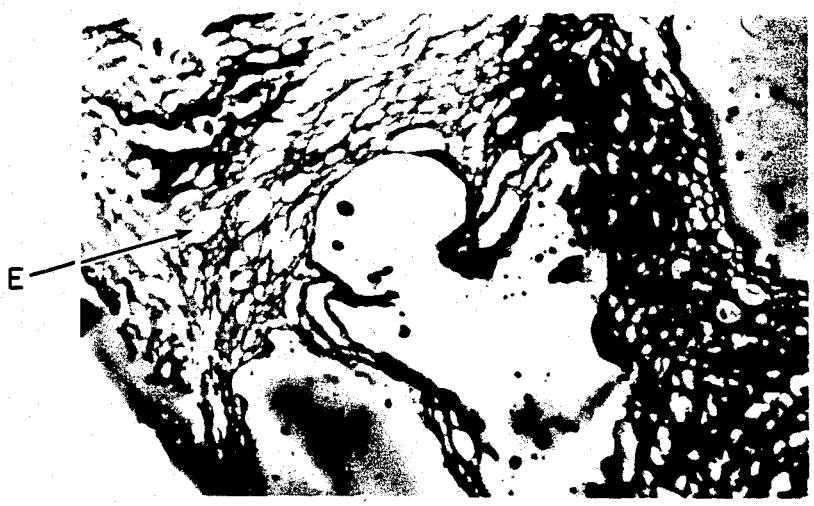
FIGS. 7 and 9 each depict a photomicrograph of unacidified analog magnified sixteen times and stained with osmium tetraoxide vapors.
Figure 8:
FIGS. 8 and 10 each depict a photomicrograph of acidified analog magnified sixteen times and stained with osmium tetraoxide vapors.
Figure 9:
Figure 10:
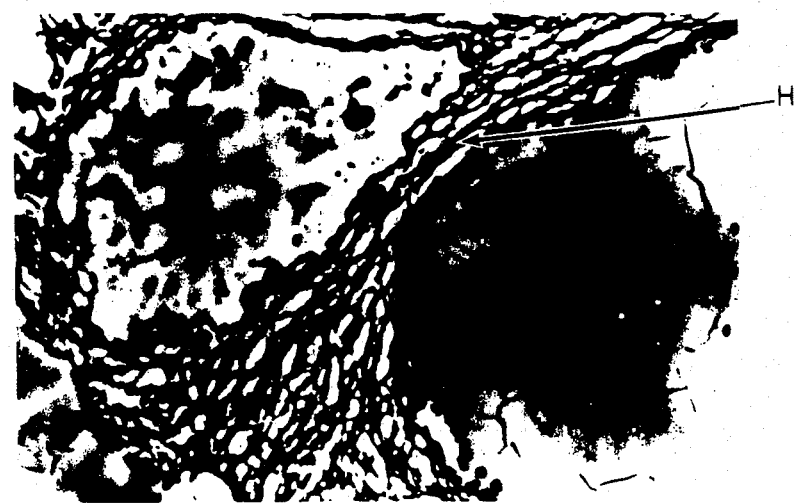

The final step of the process of the present invention is equilibrating the product until the pH is less than 4.6 in all parts of the product. Equilibration is continued until the total product pH and the center pH of each analog piece are less than 4.6. In the present invention the preferred equilibrium pH for the sauce product is from about 4.0 to about 4.5, most preferably from about 4.20 to about 4.4. It has been found that acidification of the analog prior to its combination with the sauce components of the product minimizes the required pH equilibration time. Immediately after processing, pieces of analog can have a center pH greater than that of the food product as a whole. When the total product is acidified, instead of the analog separately, the product must be refrigerated during equilibration because large pieces do not achieve a low enough pH quickly enough to prevent the growth of *Clostridium botulinum*.

pH equilibration time is minimized by the proper porosity and particle size of the analog. Protein extruded at a combination of temperature and pressure under which water vaporizes has an expanded porous structure. The diffusion mobility of the hydrogen ion is greater in a porous than in a dense structure. The particle size determines the diffusion path length of the hydrogen ion. Thus the particle size and porosity can be optimized to decrease pH equilibration time. In the process of the present invention, pieces having a diameter of about $\frac{3}{4}$ inch (1.91 cm) will equilibrate to a center pH of 4.6 or less in about 24 to 48 hours when stored at ambient conditions. This is demonstrated by FIG. 2. No refrigeration is required during the equilibration period.

PRODUCT

The product of the present invention comprises a shelf-stable sauce product having an equilibrium pH of less than about 4.6 and containing textured protein or analog at a level greater than 5% by weight. The analog is present at a level of from about 5% to about 70% by weight, preferably from about 10% to about 50% by weight of the total product. Preferably, the equilibrium pH is from about 4.0 to about 4.5 The analog has a minimum specific firmness of texture of 75 kg-cm as measured by the meat grinder method, which is described hereinafter. The product has a maximum neat analog fat content of about 18% by weight and a water activity of about 0.96 or greater.

Acidification of analog prior to its combination with the sauce components of the product has the effect of decreasing the amount of fat absorbed by the protein during heatsetting, thereby reducing the fat content of the sauce product. It has been found that acidification causes swelling of the internal protein structure resulting in a reduction in the size of the voids present. This is illustrated by FIGS. 3-10. FIGS. 3, 5, 7 and 9 represent typical photomicrographs of unacidified analog, while FIGS. 4, 6, 8 and 10 represent typical photomicrographs of acidified analog. All photomicrographs were at 16 times magnification. FIGS. 3, 4, 5 and 6 were stained to show protein and carbohydrates using a periodic acid-leucobasic fuchsin (Schiff's)—aniline blue black procedure described hereinafter. A comparison of FIGS. 3 and 5 of unacidified analog with FIGS. 4 and 6 of acidified analog shows a reduction in the void spaced causes by the swelling of the protein structure due to the acidification. FIGS. 7, 8, 9 and 10 were stained via osmium tetraoxide vapors by a procedure described hereinafter to highlight the fat present in addition to the protein and carbohydrate. A comparison of FIGS. 7 and 9 of unacidified analog with FIGS. 8 and 10 of acidified analog demonstrates a thickening of the cell walls corresponding to a decrease in the void space.

The decrease in void space corresponds to a decrease in fat uptake during frying for the acidified analog. The smaller pore structure in the protein results in less fat being absorbed during heatsetting. Acidified protein also has a lower hydration capacity than unacidified protein. Since during heatsetting it is believed that the fat is exchanged for water, the reduced hydration capacity of the protein means it has a reduced capacity for fat absorption. A longer pH equilibration time is required for product containing analog with high levels of fat. Thus a reduction in fat uptake decreases equilibration time.

For the acidified product of this invention the fat level of the fried analog or neat analog is from about 12% to about 18% by weight. When unacidified analog is added to sauce, and the combination is then acidified and processed in a similar manner, the neat analog fat content is typically from about 19% to about 22% by weight. Thus, the fat content of a product containing analog can be reduced by about 5% by weight through use of direct acidification of analog prior to its combination with the sauce. Those products containing a meat component can have slightly higher fat contents.

The decrease in void space also correlates to a strengthening of the analog texture. This firmer texture is less porous and less likely to disintegrate. Thus in contrast to the adverse effect of acidification on meat or poultry of yielding a soft mushy texture, acidification of analog yields a desirable firm texture. Ground beef acidified according to the above process to a pH of 4.8 approaches the beef's isoelectric point and the meat disintegrates into smaller pieces with reduced diameter. It becomes soft or mushy in texture, appears gray, and develops a bad taste. The screened analog of the product of the present invention at pH less than 4.6 has a minimum firmness of about 75 kg-cm as measured by the meat grinder method, and usually is from about 75 to about 180 kg-cm. Typical commercially available products containing textured vegetable protein have a protein chunk texture of about 20 to about 65 kg-cm, when measured by the meat grinder method.

An additional benefit of this invention is that there is no increase in sour flavor display when an acidified analog is used. It is known that as pH is decreased due to acidification, tartness or sourness of flavor increases. In product where an unacidified analog is used, product equilibrium pH has to be strictly controlled to maintain high product acceptance by consumers. Any product equilibrium pH less than 4.50 was found to be unacceptable due to its sourness. With the use of acidified analog the pH of the final product can be lowered to less than 4.50 and still result in product that is not unacceptably sour. For the product of this invention it is most preferred that the final product equilibrium pH be 4.2 to 4.4.

The product of the present invention has a water activity of about 0.96 or greater. Typically, the water activity is between 0.96 and 1.00. Complete hydration of the textured protein is necessary to optimize product flavor and texture. Restriction of the water level in the product decreases flavor and adversely affects texture.

It has been determined that keeping the pH between 4.4 and 4.6, while effective to prevent development of *Clostridium botulinum*, is insufficient to prevent development of flat sour spoilage, caused by activity of *Bacillus coagulans*. In addition to acidification to a particular pH range, a minimum organic acid level is required for control of the latter microorganism. An organic acid level of at least 0.4% organic acid expressed as anhydrous citric acid is required for long-term shelf stability.

In general, any food-compatible acid, or combination of food-compatible organic and inorganic acids, is acceptable for lowering the pH. Edible organic acids which can be used herein include fumaric, citric, malic, acetic, lactic, propanoic, adipic, tartaric, succinic, and the like. A certain level of inorganic acids may also be used for lowering the pH. These acids are not counted in the organic acid level. These include phosphoric, carbonic, sodium hydrogen phosphate, anhydric chloric acid, and the like. Within the pH limit of the organic acid level, certain acids and combination of acids will provide more acceptable flavor, depending upon the product being formulated. For example, acidification with citric acid provides more sourness and sharpness than acidification with hydrochloric acid at a given pH. Acetic acid can add a vinegary flavor to foods.

Determination of the specific pH and organic acid level of any particular product can readily be done by standard analytical techniques described hereinafter. Alternatively, the organic acid level can be calculated in advance by adding together the organic acid contents of each of the ingredients of the food product, along with any organic acids added as part of the formulation. Acid can be added as needed or excess acid can be neutralized as required to obtain the desired pH.

It can be appreciated that still other executions of this invention can be deviced without departing from its scope and spirit and without losing its advantages. Minor processing parameters and product ingredients can be altered without departing from the scope of the invention. In particular, an acidified sauce product containing high levels of analog has firm texture, no increase in sour flavor, and reduced levels of fat. Acidification of the analog prior to its combination with the sauce component of the product, however practiced, reduces pH equilibration time promoting product safety, and results in product of improved texture, and reduced fat content.

Testing Methods

A. pH of Analog Pieces

The analog was separated from the sauce by pouring the product through a 0.500 inch screen. The contents of the screen were drained and blotted with a paper towel to remove free sauce. An individual analog chunk was then placed at 25° C. onto a Microelectrode Model MI-410 Combination Electrode available from Microelectrodes, Inc., Londonderry, NH 03053. The pH was read after on minute. The pH of a minimum of 15 analog chunks was determined and averaged with calibration of the electrode after every 5 readings. pH was also separately determined for the screened sauce and total product using standard methods, as defined in 21 CFR 114.90, the disclosure of which is fully herein incorporated by reference.

B. Organic Acids

Organic acids were determined using the method of Rife et al., Food Research, Vol. 19, pp. 106–114 (1954), or by the methods described in *Official Methods of Analysis of the Association of Official Analytical Chemists*, 12th Ed. (1975), §22.060 to §22.061, p. 401, the disclosures of which are all fully incorporated herein by reference.

C. Organic Acids by Titratable Acidity

A sauce sample is diluted and titrated with 0.1 normal sodium hydroxide to a pH of 8.1. The titratable acidity is expressed as percent in hydrocitic acid.

D. Fat Content

The fat content of the total product, screened sauce, and screened analog were determined using pulsed nuclear magnetic resonance (hereinafter PNMR), as described in Madison and Hill, J. Amer. Oil Chem. Soc., 55, 328–331 (1978). The PNMR reading is related to a tricaprylin standard calibration curve correlated with raw materials used in the product.

E. Texture

The texture was measured as the amount of energy required to compress an analog sample. A standard sample weight is compressed and extruded in a texture cell. A Chatillon Universal Test Stand Model UTSE, available from John Chatillon and Sons, New York, N.Y., was employed. The force and distance outputs were interfaced with an Apple II computer for energy calculations, graphical displays, and data analysis. Extrusion energy, slopes, liquid extrusion force, peak extrusion force, density, springback force, and springback to peak ratio, were determined.

(1) Meat Grinder Method

A specific weight sample of analog is placed into a cylindrical container. The bottom of the container has holes and the container has no top. A plunger forced by a flat disk attached to the Chatillon load cell is inserted into the container and used to force the analog through the holes in the bottom of the container (like in a meat grinder). The diameter of the container and plunger are designed so that all of the sample is extruded from the container. The disk has a larger diameter than the plunger and container. The plunger is forced down into the sample container at a fixed speed for a fixed distance. When the liquid extracted by the pressure reaches a certain marked level in the container it is noted to mark the liquid extrusion force. After the plunger has moved a fixed distance, a graph of force vs. displacement is prepared and extrusion energy calculated from the area under the resulting line on the graph. The Meat Grinder Energy is a measure of toughness of the material measured.

F. Photomicrographs

The analog samples were frozen using a Minotome Cryostat, sectioned about 8 to 10 microns in thickness, and placed on gelatin coated or plain slides. Sections on gelatin coated slides were stained using Periodic Acid—Leucobasic Fuchsin (Schiff's)—Aniline Blue Black (Pro-Carb) as described below. Those on plain slides were stained using osmium tetraoxide as described below. Photomicrographs were taken using a Universal or Zeiss microscope at sixteen times magnification using Kodachrome 40, Type A Film 5070.

For the pro-carb staining, sections on slides were treated with the following solutions. In each case the solution was pipetted onto the slide, allowed to sit for the indicated time, and the excess drained off the slide.

Distilled water, 0.5% Periodic acid for 3 minutes, tap water for 1 minute, distilled water for 1 minute, Leucobasic Fuchsin for 2 minutes, 2% sodium bisulfite for 1 minute, tap water for 1 minute, 0.05% aniline blue black for 2 minutes, 7% acetic acid for 2-3 seconds, and one drop of 50:50 alcoholic glycerine. The slides were then covered and photographed.

For the osmium tetraoxide staining a fresh solution of 2% osmic acid in methanol was prepared and placed in a desiccator, and the slides placed in a circle equi-distant from the acid container. The desiccator was covered, sealed, and the samples exposed for about 16 hours to the osmium tetraoxide vapors generated. The osmic acid solution was then removed from the desiccator and the slides exposed to air for about 1 hour. Mineral oil was then pipetted onto the slides and they were covered and photographed.

The following examples illustrate the inventions described herein, but are not intended to define the limits thereof. All percentages are by weight unless otherwise stated.

EXAMPLE 1

Example 1 illustrates the process and product of the present invention wherein the analog component is acidified prior to its combination with the sauce.

A spaghetti sauce was prepared according to the following formula:

| Ingredient | Weight Percent |
|---|---|
| Tomatoes | 36.6 |
| Spices and Seasonings | 3.4 |
| Citric Acid | 0.1 |
| Oil | 2.6 |
| Meat analog | 20.0 |
| Water | 37.3 |

The tomatoes, spices and seasonings, citric acid, oil, and water, were combined in a 50 gallon Hamilton kettle with a steam-heated jacket and heated to about 120° F. (49° C.) to about 140° F. (60° C.) with agitation over a period of about 2 hours. The pH of the mixture was adjusted to about 4.2. The mixture was then heated to 160° F. (71° C.), and thermally processed by passing through a Crepaco VT460 swept surface heat exchanger to achieve high-temperature-short-time commercial sterilization. The temperature was raised to 255° F. (124° C.), maintained for 45 seconds, and then cooled to about 140° F. (60° C.).

A soy protein concentrate, Procon 2000, manufactured by the A. E. Staley Company, was mixed with water to a moisture level of about 40% and worked to a dough in a Werner & Pfleiderer twin screw extruder in a manner so that strands of extrudate were formed.

The dough temperature immediately prior to exit from the extruder was about 170° C. (338° F.) and the pressure was about 600 psig. As the strands of dough exited from the extruder die, they were expanded somewhat by release of steam to a diameter of about 6 mm. The extrudate strands were cut into lengths of about 1.5 cm by a rotary shear. The pieces were air conveyed to a knife impact mill with 16 blades rotating at a tip velocity of about 48 m/sec. Particles were sheared and reduced in size as they impacted against a plate perforated with ⅜" square openings at the mill discharge.

This particulate extrudate was mixed with dry flavorants and then hydrated with acid and water at about 87° C. to 93° C. (190° F. to 200° F.) to a pH of about 4.8. The resulting slurry was cooled to about 49° C. (120° F.), mixed with egg white binder until the mixture was homogeneous and little free liquid was apparent. The finished slurry contained by weight about 70% water, 2.2% egg white solids, 3.8% flavorants and the remainder extrudate solids.

The slurry was then formed on a moving continuous belt as a layer about ½ inch thick and about 10 inches wide. This layer was dropped a short distance onto a mesh belt traveling somewhat faster than the forming belt so that partially separated lumps of slurry of various sizes were formed. The moving mesh belt was immersed in the vat of a continuous fryer which contained fat controlled at 130° C. Immersion of the mat was maintained by an upper second belt of like design conveyed at the same speed as the lower belt. The space between the belts was larger than the thickness of the mat.

The analog was fried for about 3.5 minutes. The analog exiting from the fryer was in pieces of various sizes and thicknesses. This analog was then drained free of excess fat and cooled in containers. Fat content of the fried analog was determined as previously described.

The meat analog component and sauce components were combined and the product heated to about 190° F. (88° C.) in about 25 minutes. The product was then held at about 190° F. (88° C.) for about 20 minutes. Several jars were then filled with product, capped, inverted, and cooled.

After cooling, pH measurements were obtained for the screened sauce and center pH measurements were obtained for the screened analog using the method previously described. Fat content for the sauce product was determined using the method previously described. Product was stored at 40° F. (4° C.) and 70° F. (21° C.) and the pH measured at 24 hour intervals. The data are summarized in Table I. The analog center particle pH equilibrated to less than 4.6 within 24 hours.

TABLE I-A

| | Acidified Anolog | | | | | |
|---|---|---|---|---|---|---|
| Sample | 1 | | | 2 | | |
| Fat, % | | | | | | |
| Neat anolog | 12.1 | | | 13.8 | | |
| Total product | — | | | 5.3 | | |
| | | Analog Center | | | Analog Center | |
| pH | Sauce | Average | Maximum | Sauce | Average | Maximum |
| After processing | 4.25 | 4.64 | 4.72 | 4.38 | 4.81 | 4.90 |
| When stored at 70° F. | | | | | | |
| 24 hours | 4.30 | 4.53 | 4.63 | 4.39 | 4.58 | 4.67 |
| 48 hours | 4.37 | 4.48 | 4.55 | 4.40 | 4.49 | 4.54 |
| 72 hours | | | | 4.42 | 4.48 | 4.50 |

Product prepared according to the formula and process of Example 1 was analyzed for center pH on the screened analog. The analog was then mascerated and analyzed for pH. The data is summarized in Table I-B and demonstrates that analog center pH is typically higher than the pH on the macerated analog, thus necessitating pH equilibration to assure product safety.

TABLE I-B

| | Analog pH | | |
| | Center pH | | |
| | Average | Maximum | Macerated pH |
|---|---|---|---|
| After processing | 4.64 | 4.69 | 4.57 |
| | 4.67 | 4.72 | 4.56 |
| | 4.59 | 4.63 | 4.52 |
| | 4.72 | 4.82 | 4.58 |
| | 4.66 | 4.78 | 4.53 |
| | 4.92 | 5.00 | 4.64 |
| | 4.83 | 5.02 | 4.57 |
| | 5.01 | 5.03 | 4.82 |
| | 4.90 | 5.05 | 4.78 |
| | 4.95 | 5.01 | 4.75 |
| | 5.14 | 5.18 | 4.82 |
| | 5.00 | 5.13 | 4.79 |
| | 4.98 | 5.10 | 4.77 |
| | 4.74 | 4.79 | 4.65 |
| | 4.69 | 4.78 | 4.62 |
| 24 hours | 4.59 | 4.63 | 4.37 |
| | 4.51 | 4.52 | 4.35 |
| | 4.52 | 4.58 | 4.36 |
| | 4.56 | 4.62 | 4.38 |
| | 4.50 | 4.54 | 4.35 |
| | 4.67 | 4.69 | 4.41 |
| | 4.53 | 4.60 | 4.40 |
| | 4.50 | 4.54 | 4.38 |
| | 4.90 | 4.96 | 4.67 |
| | 4.72 | 4.78 | 4.62 |
| | 4.70 | 4.75 | 4.60 |
| | 4.80 | 4.81 | 4.62 |
| | 4.71 | 4.79 | 4.61 |
| | 4.67 | 4.70 | 4.57 |
| | 4.66 | 4.67 | 4.56 |
| | 4.65 | 4.71 | 4.54 |
| | 4.60 | 4.63 | 4.54 |
| 48 hours | 4.51 | 4.55 | 4.36 |
| | 4.48 | 4.50 | 4.34 |
| | 4.46 | 4.49 | 4.32 |
| | 4.51 | 4.54 | 4.33 |
| | 4.47 | 4.52 | 4.33 |
| | 4.53 | 4.55 | 4.36 |
| | 4.53 | 4.54 | 4.38 |
| | 4.50 | 4.56 | 4.35 |
| | 4.66 | 4.66 | 4.56 |
| | 4.63 | 4.67 | 4.55 |
| | 4.59 | 4.60 | 4.52 |
| | 4.63 | 4.67 | 4.54 |
| | 4.60 | 4.64 | 4.53 |
| | 4.58 | 4.61 | 4.52 |
| | 4.58 | 4.59 | 4.53 |
| | 4.57 | 4.59 | 4.53 |
| | 4.56 | 4.57 | 4.52 |

EXAMPLE 2

Example 2 illustrates preparation of the product of the present invention by a process wherein the analog and sauce components are combined prior to acidification. A spaghetti sauce was prepared according to the following formula:

| Ingredient | Weight Percent |
|---|---|
| Tomatoes | 33.3 |
| Spices, Seasonings and Colorant | 3.5 |
| Citric Acid | 0.1 |
| Oil | 2.5 |
| Meat Analog | 19.6 |
| Water | 38.5 |
| Ground Beef | 2.5 |

Product was prepared according to the process of Example 1 except that the protein extrudate was hydrated with water. No acid was mixed with the water. The pH was about 6.0. After the analog, beef, and sauce components were combined the pH was adjusted to 4.47 and the product heat processed as in Example 1. pH and fat content were obtained for the product as in Example 1. Data are summarized in Table II and demonstrate that this product had a higher fat content, and required about two weeks for the pH to equilibrate to below 4.6.

TABLE II

Acidified Total Product
Fat level of fried analog from about 19% to about 22% by weight.

| | | Analog Center | |
| pH | Sauce | Average | Maximum |
|---|---|---|---|
| After processing | 4.50 | 5.01 | 5.49 |
| When Stored at 40° F. | | | |
| 30 hours | 4.52 | 4.82 | 5.09 |
| 72 hours | 4.53 | 4.69 | 4.80 |
| 6 days | 4.51 | 4.56 | 4.61 |
| 12 days | 4.54 | 4.55 | 4.58 |
| When Stored at 70° F. | | | |
| 30 hours | 4.53 | 4.64 | 4.76 |
| 70 hours | 4.53 | 4.59 | 4.67 |
| 6 days | 4.54 | 4.57 | 4.62 |

EXAMPLE 3

Two commercially available spaghetti sauces, Brands A and B, were combined with ground beef and acidified. In a first case the sauce was acidified before addition of the beef. In the second case, the same two sauces were each combined with ground beef that had been acidified to pH 5.15. A pH of 5.15 was as low as could be obtained without particle size disintegration. (Previously, acidification of ground beef to pH 4.8 resulted in a grayish, bad-tasting beef which disintegrated into small particles.) In all cases the ground beef level was 24% by weight and the total product was acidified to a pH of 4.4. The internal pH of the beef particles were measured for equilibration. The resulting data are summarized in Table III and FIG. 1, indicating pH equilibration to 4.4 had not occurred after 48 hours. The product pH generally remained greater than 4.6, the FDA limit for acidified foods, and it is possible that *Clostridium botulinum* would occur unless more severe processing conditions for sterilization were employed.

TABLE III

Acidified Ground Beef Product

| | Sauce Product | | | |
| | A | | B | |
| | Acidified Sauce | Acidified Beef | Acidified Sauce | Acidified Beef |
|---|---|---|---|---|
| pH after processing | | | | |
| Beef | 5.75 | 5.04 | 5.61 | 4.88 |
| pH when stored at 40° F. | | | | |
| 24 hours | | | | |
| Beef | 5.11 | 4.74 | 5.08 | 4.59 |
| 48 hours | | | | |

TABLE III-continued

| | Acidified Ground Beef Product | | | |
|---|---|---|---|---|
| | Sauce Product | | | |
| | A | | B | |
| | Acidified Sauce | Acidified Beef | Acidified Sauce | Acidified Beef |
| Beef | 4.76 | 4.63 | 4.75 | 4.53 |

EXAMPLE 4

The spaghetti sauce product of Examples 1 and 2, and several commercially available sauce products containing textured protein or meat were analyzed for pH and texture according to the meat grinder method previously described. All analyses were performed on screened analog or screened meat. The center pH of typical large pieces were determined. If only small pieces were present, the pH of the total product was determined. The data demonstrated that the claimed sauce product illustrated by Example 1 had a firmer texture and was not rendered soft or mushy by its acidification during processing. The resulting data is summarized in Table IV.

TABLE IV

| | Product | Meat Grinder Energy kg-cm | Center pH | Piece diameter, cm |
|---|---|---|---|---|
| A. | Textured Protein Products | | | |
| | Example 1 | 115.5 | 4.50 | 1.91 |
| | Example 2 | 80.9 | 4.56 | 1.91 |
| | Commercial chili Brand A | 65.8 | 5.22 | <0.47 |
| | Commercial vegetarian pie pie Brand B | 61.1 | 5.82 | 1.27 |
| | Commercial chili Brand C | 19.1 | 5.60 | <0.47 |
| | Commercial artificial meatballs, Brand D | 29.8 | 5.57 | 3.81 |
| B. | Meat and Textured Protein Mixture Products | | | |
| | Commercial chili brand E | 46.0 | — | 1.27 |
| | Commercial chili brand F | 54.7 | 5.68 | <0.47 |
| | Commercial chili brand G | 35.3 | 5.75 | 1.27 |
| C. | Meat Products | | | |
| | Commercial spaghetti and meatballs Brand H | 27.3 | 4.97 | 3.38 |
| | Commercial spaghetti and meatballs Brand I | 52.9 | 4.73 | 3.38 |
| | Commercial spaghetti and meat sauce Brand J | — | 4.03 | — |
| | Commercial spaghetti and meat sauce Brand K | — | 4.03 | — |
| | Commercial cocktail meatballs Brand L | 16.5 | 5.05 | — |
| | Commercial Swedish meatballs Brand M | 62.1 | 4.65 | — |

EXAMPLE 5

A spaghetti sauce product was prepared according to the formula of Example 2 and process of Example 1. The textured protein was acidified directly to a pH of 4.8. The sauce was adjusted to a pH of about 4.2. The acidified analog and sauce were then combined and processed as in Example 1. The same formula product was prepared according to the process of Example 2 wherein the unacidified analog and sauce were combined prior to acidification. The pH of both final products was 4.3.

The products were evaluated for flavor by a panel of 40 consumers and by a second panel of 10 experts. The consumers were asked to identify which product was more sour in flavor. Neither product predominated since 19 consumers identified the product containing acidified analog as more sour, and 21 consumers identified the product containing unacidified analog as more sour. Thus, the acidification process of the present invention does not yield a product with increased sour flavor.

Seven of ten of the expert panelists determined that the product containing acidified analog was less sour than that containing unacidified analog. This represents an 82.8% probability statistically that sour flavor is less when the process of the present invention is employed. Thus, direct acidification of the textured protein to decrease pH does not result in a product with increased sour flavor.

What is claimed is:

1. A process for preparing an improved shelf-stable sauce product containing a textured protein meat analog comprising:
    (a) adding an edible acid to textured protein material having at least about 25% protein content by weight to lower the pH of said textured protein material to a pH between 3.8 and about 5.5;
    (b) adding a proteinaceous binder to the acidified textured protein material of step (a) to effect agglomeration;
    (c) heatsetting the agglomerated acidified textured protein of step (b) in the presence of oil to form a meat analog with a structure simulating loose, cooked ground meat;
    (d) combining the meat analog of step (c) with a sauce, said sauce having a pH of less than about 4.5;
    (e) heating the sauce product comprising the combination to effect sterilization; and
    (f) equilibrating the pH of the components combined in said sauce product until the pH of any portion of said sauce product is less than about 4.6, said pH of 4.6 being achieved within a period of about 48 hours.

2. The process of claim 1 wherein the textured protein material of step (a) is hydrated with an edible acid in water.

3. The process of claim 1 wherein the textured protein material of step (a) is hydrated prior to addition of the edible acid.

4. The process of claim 1 wherein the edible acid is an inorganic acid.

5. The process of claim 4 wherein the edible acid is phosphoric acid.

6. The process of claim 1 wherein the sauce product further comprises meat as a component, said meat acidified as necessary to a pH not below 5.15 prior to combination with a sauce, provided that any portion of said meat has a pH less than about 4.6 within a period of about 48 hours after sterilization of said sauce product.

7. The process of claim 1 wherein the proteinaceous binder comprises egg white.

8. The process of claim 7 wherein the amount of egg white is from about 2% to about 12% by weight of the agglomerated textured protein.

9. The process of claim 8 wherein the amount of egg white is from about 6% to about 12% by weight of the agglomerated textured protein when the protein has been acidified to a pH of less than about 4.6.

10. The process of claim 8 wherein the amount of egg white is from about 2% to about 6% by weight of the agglomerated textured protein when the protein has been acidified to a pH of greater than about 4.6.

11. The process of claim 7 wherein said heatsetting of said acidified textured protein and said proteinaceous binder in the presence of oil comprises at least partial immersion of said textured protein and proteinaceous binder in said oil having a temperature of from about 104° C. to about 177° C.

12. The process of claim 7 wherein said heatsetting is by microwave.

13. The process of claim 1 wherein the sauce of step (d) is sterilized prior to its combination with the analog.

14. A process for reducing the pH equilibration time for a shelf-stable sauce product containing textured vegetable protein comprising hydration of the textured protein material with an edible acid in water to provide a pH of from about 3.8 to about 5.18, adding a proteinaceous binder to the acidified textured protein material to effect agglomeration, and heatsetting the mixture of said proteinaceous binder and acidified textured protein material in edible oil to form a meat analog with a structure simulating loose, cooked ground meat and combining said heatset mixture of textured protein material and binder with a sauce.

15. The process of claim 14 further comprising the combination of said meat analog with a sauce having a pH of less than about 4.5 and equilibrating the pH after combination of the sauce and the meat analog until each discrete piece of meat analog has a center pH of less than about 4.6.

16. The process of claim 15 wherein the time required to reach equilibration is from about 24 to about 48 hours.

17. The process of claim 1 wherein said shelf-stable sauce product comprises tomatoes, seasonings and spices, said shelf-stable sauce product having a water activity of about 0.96 or greater.

18. In a process for producing a textured protein meat analog having a structure simulating loose, cooked ground meat wherein said meat analog comprises an extrusion cooked vegetable protein material and from about 2% to about 12% by weight on a solids basis of a proteinaceous binder comprising egg white, the mixture of said protein material and said binder being heatset in the presence of edible oil, the improvement comprising the steps of acidifying the cooked vegetable protein material to a pH of from about 4.0 to about 5.5, combining said protein material with said binder and heatsetting said mixture in the presence of edible oil, said acidification providing decreased absorption of edible oil during heatsetting.

19. The process of claim 18 wherein the textured protein is acidified by hydrating with an edible acid in water.

* * * * *